United States Patent [19]

Forest

[11] Patent Number: 5,097,341
[45] Date of Patent: Mar. 17, 1992

[54] DOCUMENT COPIER WITH JOB QUEING

[75] Inventor: Paul H. Forest, Rochester, N.Y.

[73] Assignee: Eastman Kodak Company, Rochester, N.Y.

[21] Appl. No.: 553,509

[22] Filed: Jul. 18, 1990

[51] Int. Cl.$^5$ .................. H04N 1/21; H04N 2/23
[52] U.S. Cl. .................................. 358/296; 358/444
[58] Field of Search .............. 358/296, 300, 302, 401, 358/403, 404, 444, 442; 355/308; 346/76 PH, 107 R, 108, 140 R, 153.1, 160

[56] References Cited

U.S. PATENT DOCUMENTS

| | | | |
|---|---|---|---|
| 3,597,071 | 7/1971 | Jones | 355/3 |
| 4,375,916 | 3/1983 | Levine | 355/5 |
| 4,564,864 | 1/1986 | Maeshima | 358/444 |
| 4,585,333 | 4/1986 | Yamagishi | 355/14 R |
| 4,905,098 | 2/1990 | Sakata | 358/468 |
| 4,918,490 | 4/1990 | Stemmle | 355/301 |

Primary Examiner—Benjamin R. Fuller
Assistant Examiner—Scott A. Rogers
Attorney, Agent, or Firm—Milton S. Sales

[57] ABSTRACT

A document copier includes a scanner adapted to convert images on hard copy pages of original documents to a series of image-characteristic electrical signals, and a writer adapted to form reproductions of original images according to received series of electrical data signals. Electronic memory receives image-characteristic signals from the scanner, stores the received image-characteristic signals for a plurality of original document pages, and applies electrical data signals according to the stored image-characteristic signals to the writer. The image-characteristic signals stored by the memory are organized into jobs according to operator instructions such that at least one subsequent job can be loaded into the memory while electrical data signals according to a prior job are being applied to the writer from the memory.

6 Claims, 3 Drawing Sheets

DOCUMENT COPIER WITH JOB QUEING

BACKGROUND OF THE INVENTION

1. Technical Field

This invention relates generally to electronic document copiers with multi-page electronic memories, and more particularly to providing such copiers with the capability of receiving and storing a plurality of jobs in such memories.

2. Background Art

Electronic document copiers are known that include a buffer memory for electronically storing scanned image data and printing instructions for a plurality of pages of a job. An advantage of such copiers is that originals need be scanned only once, even to make multiple copies for either collated or non-collated sets. Once stored, the pages can be printed as often as desired to produce a plurality of such sets.

Such copiers are limited to storage of only single jobs, and most jobs will not utilize the memory's full capacity. Operators desiring to copy second and subsequent jobs must stand by the scanner and wait for the job being run to be completed before being able to begin scanning the next job into the memory.

However, the number of originals which could be processed by the memory is limited only by the capacity of the memory, considering the image content and data compression. The present invention makes use of this memory capacity and provides operators with the ability to scan all or at least a portion of new jobs into the memory, even while the memory is busy processing prior jobs. Many document copiers are used in "walk-up" environments, which makes job queueing even more desirable so that the user can return to his or her work place while the job is waiting to be produced.

DISCLOSURE OF INVENTION

Accordingly, it is an object of the present invention to provide a document copier in which jobs can be scanned and loaded into electronic memory of a marking engine even while that memory and/or associated writer are busy processing a previously loaded job or jobs, and wherein the jobs will be processed when the writer is later available.

A document copier according to the present invention includes a scanner adapted to convert images on hard copy pages of original documents to a series of image-characteristic electrical signals, and a writer adapted to form reproductions of original images according to received series of electrical data signals. Electronic memory receives image-characteristic signals from the scanner, stores the received image-characteristic signals for a plurality of original document pages, and applies electrical data signals according to the stored image-characteristic signals to the writer. The image-characteristic signals stored by the memory are organized into jobs according to operator instructions such that at least one subsequent job can be loaded into the memory while electrical data signals according to a prior job are being applied to the writer from the memory.

The invention, and its objects and advantages, will become more apparent in the detailed description of the preferred embodiments presented below.

BRIEF DESCRIPTION OF THE DRAWINGS

In the detailed description of the preferred embodiments of the invention presented below, reference is made to the accompanying drawings, in which.

BEST MODE FOR CARRYING OUT THE INVENTION

The present description will be directed in particular to elements forming part of, or cooperating more directly with, apparatus in accordance with the present invention. It is to be understood that elements not specifically shown or described may take various forms well known to those skilled in the art.

In this specification, the term "document copier" is meant to refer to apparatus arranged for reading the image information on original hard copy and for reproducing such image information on a receiver sheet. The term "original document" is meant to refer to one or more image-bearing sheets making up a job to be reproduced. The term "original document page" is meant to refer to a single surface of an image-bearing sheet.

Figure 1:
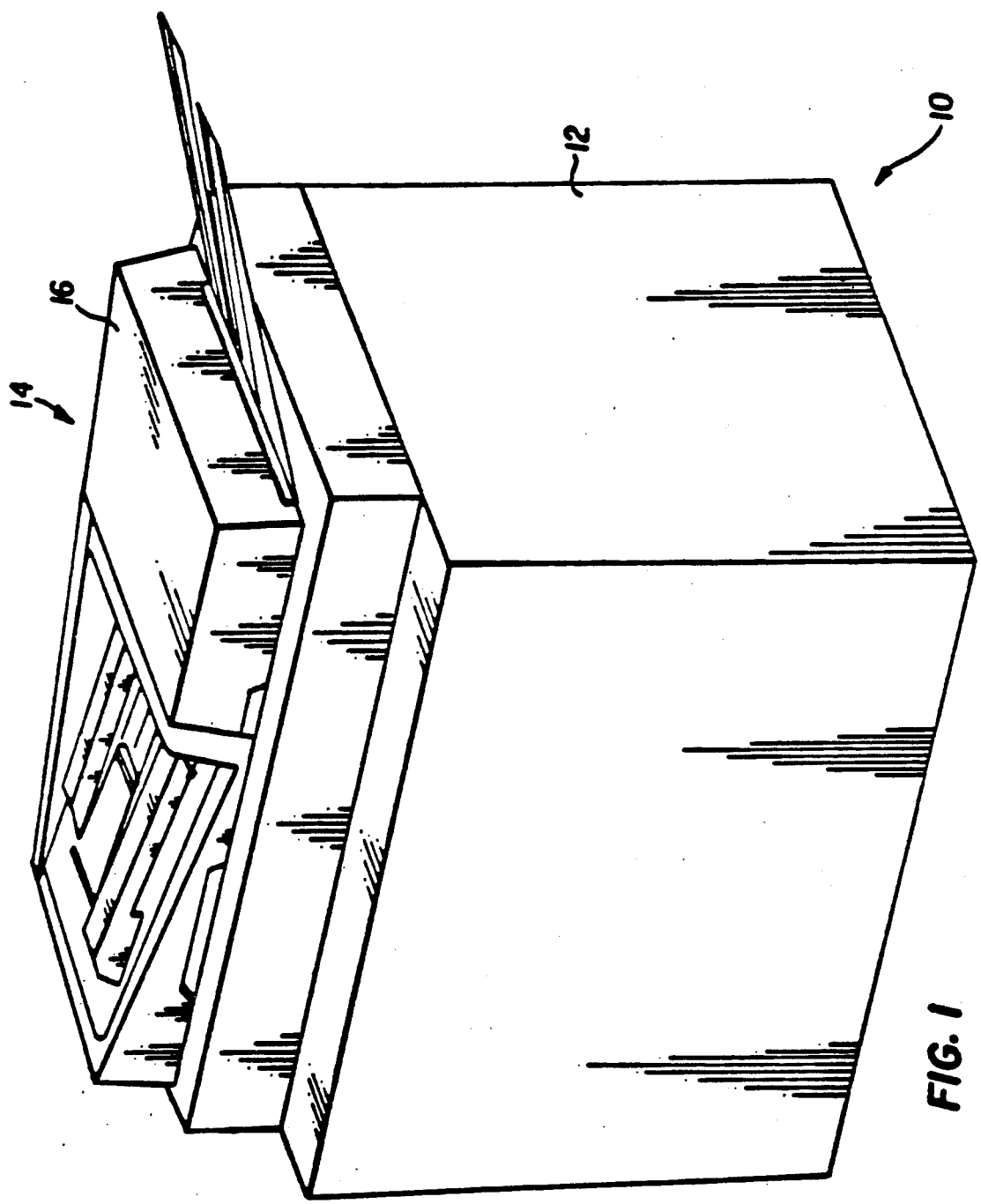
FIG. 1 is a perspective view of a document copier according to the present invention.
Figure 2:
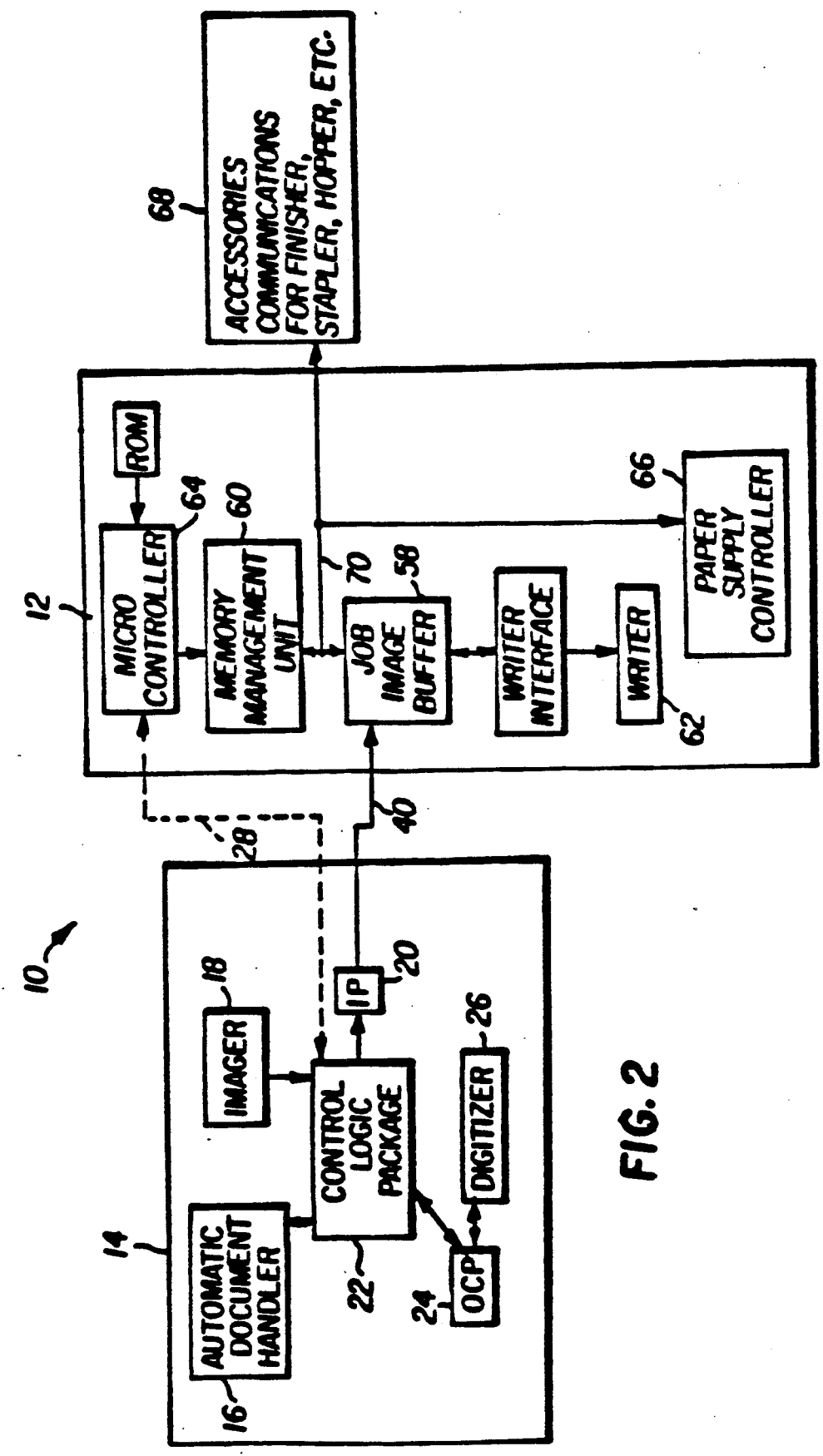
FIG. 2 is a schematic block diagram of the document copier of FIG. 1.

According to FIGS. 1 and 2, a document copier 10 includes a marking engine 12 and a document scanner 14. Scanner 14 consists of an automatic document handler 16 for stream feeding original document sheets past an optical system. Focused light reflected from an original document sheet is swept past an imager 18 such as a linear array of phototransducers (photodiodes or charge-coupled devices) for converting the image of an original document into image-characteristic electrical signals, such as signals having values representative of the image density at associated pixel areas on the original document page.

The image-characteristic signals may be manipulated by image processing electronics 20. Image processing by electronics 20 may include linearity correction, unsharp masking, image editing, windowing, document recognition, magnification, accent color, color substitution, and so on.

Scanner 14 also includes a control logic package 22 having an operator control panel 24 and a digitizer 26. The operator control panel and the digitizer are interfacing media for the operator to input functions and to receive messages from the reproduction apparatus. The logic package consists of control software, interface software, and logic hardware. Setup instructions are input to the scanner, while synchronization signals to identify separate scan lines and to provide page information and marking engine control, as well as information for finishing and processing of jobs will be sent to marking engine 12 via a job control communications link 28. Image data is applied to the marking engine through an image data bus 40.

As way of example only, functions inputted by the operator at the control panel may include image editing features such as area erase (blanking and framing), image shift, book copy modes, magnification, positive-to-negative image reversal, accent (spot) color, highlighting, forms overlay, screening selected areas for breaking a continuous tone original into dots for reproduction as half-tone images, etc.

Marking engine 12 receives bit stream image data over bus 40 and job control data over communications link 28, both for storage in a multiple page buffer memory 58. The page buffer will store that data until needed by a writer 62. The storage medium is preferably a dynamic random access memory under the control of a memory management unit 60. Memory devices may be classified as being either "totally accessible" wherein simultaneous requests for access to two different addresses can be honored, or "not totally accessible" wherein only those addresses in a particular subset can be accessed at the same time. In the embodiment of reproduction apparatus as disclosed herein, the file maintenance problem is not solvable if only one "not totally accessible" memory is used since in normal operation the scanner and the writer will generally not be working out of the same subset. Accordingly, job image buffer should preferably consist of two or more "not totally accessible" memories or at least one "totally accessible" memory.

Control means, including a micro controller 64 is arranged to perform arithmetic and logic operations and instruction decoding as well as controlling the time allocation of peripherals (such as a paper supply controller 66 and accessories 68) through a machine control communications link 70. Several output functions may be available for receiver sheets, including selection of output trays, stapling, sorting, folding, finishing, mailbox, envelope receiver, etc.

As an example of the functions of the elements so far described, it will be assumed that an operator desires to make eight collated sets of copies of an original made up of, say, twenty pages stacked in automatic document handler 16. The operator sets control panel 24 accordingly. For purposes of this example, it will further be assumed that job image buffer 58 is fully capable of storing the information from at least the twenty original pages.

Now, control logic package 22 starts in a subroutine pre-programmed according to the switches on control panel 24 to command scanner 14 to begin operation. Automatic document handler 16 is activated to move a document into an exposure station of image scanner 18.

As the scanning progresses, data (including image information and control signals) are received by job image buffer 58. As subsequent original documents are scanned, the processes described above are repeated until all of the original documents have been scanned and the data therefrom stored in job image buffer 58. Because job image buffer 58 is totally accessible (or there are two or more not totally accessible buffers), data can be removed from job image buffer 58 and transmitted to the writer at the same time that data is being written to the buffer.

One function of multiple-page image buffer 58 is to store all the pages of a particular job so that plural sets of collated pages may be produced without re-scanning the set of originals, for each set produced. As such, automatic document handler 16 need not be capable of recirculating the original, but the present invention extends as well to reproduction apparatus having recirculating document handlers.

In the above example, it was assumed that the job image buffer is fully capable of storing the information from at least the twenty original pages. Of course, this will not always be the case, and the procedure for handling this occurrence will be described below when "job batching" is explained.

Figure 3:
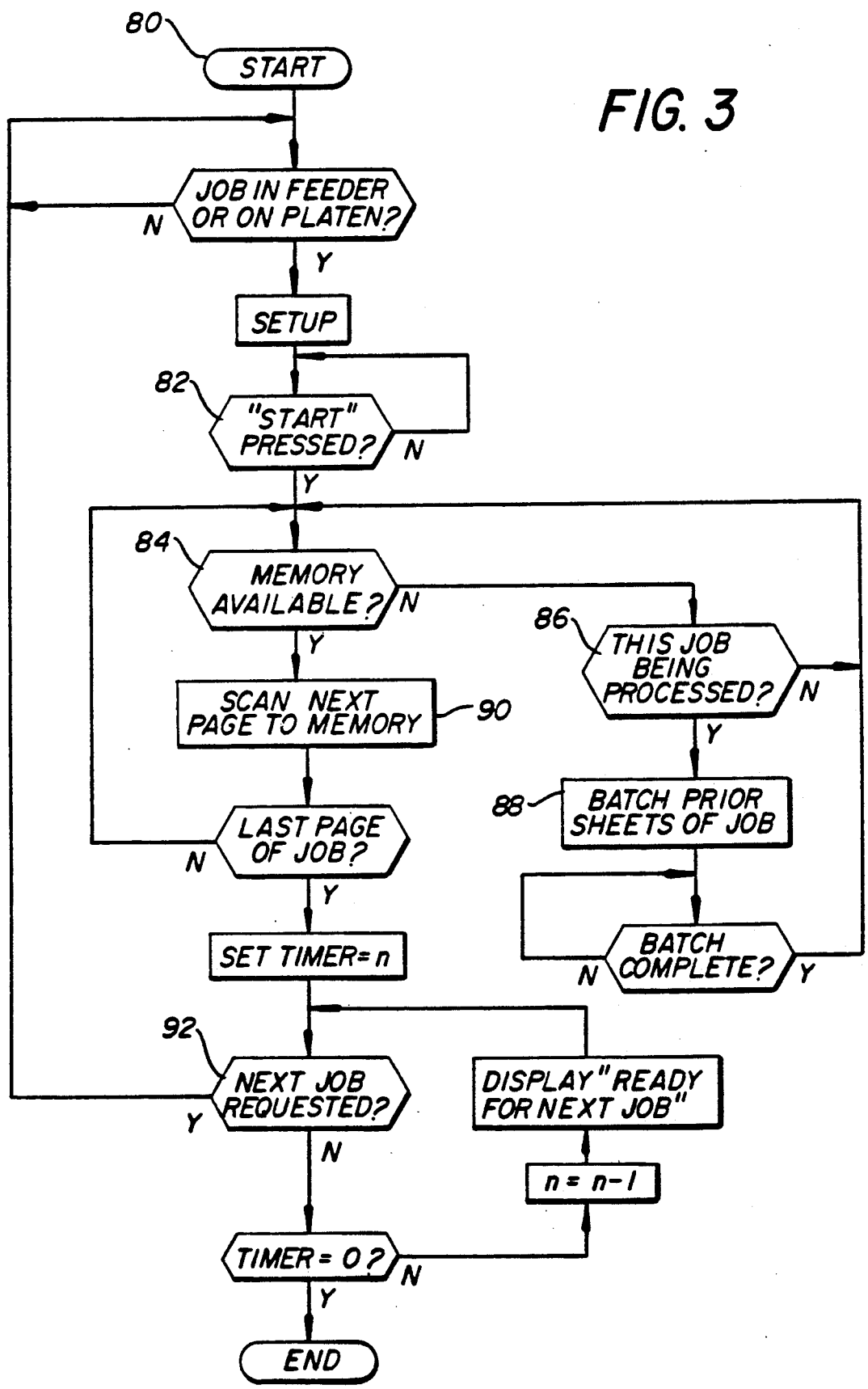
FIG. 3 is a logic flow chart showing the operation of the document copier of FIG. 1.

With reference to FIG. 3, a "START" block 80 assumes a "ready" condition of the apparatus. The operator readies a job and enters setup conditions, as desired above, before pressing an actuating button or switch; step 82.

Micro controller 64 determines if there is sufficient space available in job image buffer 58 for the next page to be scanned; logic block 84. If not, and if the next page does not belong to the job presently in-process by writer 62, the logic simply waits for memory to become available; logic step 86.

If the decision of step 86 were YES (the next page was part of the job in process, "job batching" procedure is initiated. In job batching, copy sheets formed from prior pages which could fit in the buffer are processed, and all requested collated sets of such sheets are produced and stored in designated bins of accessories 68; logic step 88. When the batch is complete, the logic returns to decision step 84; whereat, memory will now be found to be available. The next page of the original document is scanned into job image buffer 58 (logic step 90, and the process continues until the last page of the job is processed.

Once the last page of a job has been scanned into the buffer, an operator may proceed to load subsequent jobs, even while writer 62 is working out of the buffer to produce a prior job. If the operator has indicated that another job is ready, such as by pressing a suitably marked button on operator control panel 24 (step 92), the machine logic returns to the setup procedure and awaits for the START button to be pressed; step 82. Several jobs may be queued in job image buffer 58, as long as there is sufficient memory.

If the operator does not request another job, the operator control panel displays a reminder (logic step 94) until the machine times out and cycles down.

The invention has been described in detail with particular reference to preferred embodiments thereof, but it will be understood that variations and modifications can be effected within the spirit and scope of the invention.

What is claimed is:

1. A document copier comprising:
   a scanner adapted to convert images on hard copy pages of original documents to a series of image-characteristic electrical signals;
   a writer adapted to form reproductions of original images according to received series of electrical data signals;
   memory means for receiving image-characteristic signals from said scanner, storing received image-characteristic signals for a plurality of original document pages, and applying electrical data signals according to the stored image-characteristic signals to said writer; and
   means for organizing the image-characteristic signals stored by said memory means into jobs according to operator instructions such that at least one subsequent job can be loaded into said memory means while electrical data signals according to a prior job are being applied to said writer from said memory means.

2. A document copier as defined in claim 1 further comprising batching means for dividing jobs which exceed the memory means, capacity into segments to be completed separately.

3. A document copier as defined in claim 1 wherein said subsequent jobs are scanned page-by-page and loaded into said memory means as space becomes available in said memory means.

4. A document copier comprising:
   A) a scanner adapted to convert images on hard copy pages of original documents to a series of image-characteristic electrical signals; and
   B) a marking engine for producing hard copy reproductions of scanned images, said marking engine comprising:
      1) a writer adapted to form reproductions of original images according to received series of electrical data signals,
      2) memory means for receiving image-characteristic signals from said scanner, storing received image-characteristic signals for a plurality of original document pages, and applying electrical data signals according to the stored image-characteristic signals to said writer, and
      3) means for organizing the image-characteristic signals stored by said memory means into jobs according to operator instructions such that at least one subsequent job can be loaded into said memory means while electrical data signals according to a prior job are being applied to said writer from said memory means.

5. A document copier as defined in claim 4 further comprising batching means for dividing jobs which exceed the memory means, capacity into segments to be completed separately.

6. A document copier as defined in claim 4 wherein said subsequent jobs are scanned page by page and loaded into said memory means as space becomes available in said memory means.

* * * * *

UNITED STATES PATENT OFFICE
CERTIFICATE OF CORRECTION

Patent No. 5,097,341          Dated March 17, 1992

Inventor(s) Paul H. Forest

It is certified that error appears in the above-identified patent and that said Letters Patent is hereby corrected as shown below:

Col. 4, Claim 2, line 65, after "memory" change "means," to --means'--

Col. 6, Claim 5, line 12, after "memory" change "means," to --means'--

Signed and Sealed this

Eighth Day of June, 1993

Attest:

MICHAEL K. KIRK

Attesting Officer        Acting Commissioner of Patents and Trademarks